July 11, 1961 W. E. DIEFENDERFER 2,991,926
COMBINED FAN AND TURBINE
Filed Dec. 29, 1954

INVENTOR
WILLIAM E. DIEFENDERFER
BY Harris & Luther
ATTORNEY

United States Patent Office 2,991,926
Patented July 11, 1961

2,991,926
COMBINED FAN AND TURBINE
William E. Diefenderfer, Wethersfield, Conn., assignor to United Aircraft Corporation, East Hartford, Conn., a corporation of Delaware
Filed Dec. 29, 1954, Ser. No. 478,433
17 Claims. (Cl. 230—116)

This invention relates to air circulating mechanism and particularly to air temperature regulating and ventilating systems for aircraft and is concerned with the bearing lubrication and cooling in a high-speed turbine driven air-refrigerating unit utilized for supplying cooled air to aircraft compartments.

One of the objects of the present invention is a compact high speed air refrigeration unit having novel means for lubricating and cooling the bearings of the turbine-fan element.

Another object is a construction in which the refrigerated air from the turbine is passed over the bearing housing to cool the bearings.

A further object is a construction in which the expansion turbine discharge is toward and along the bearing support and the bearings themselves are sealed from air circulation, dust, and moisture.

Further objects and advantages will be apparent from the following specification and attached drawing showing the now-preferred embodiment in which.

Figure 2:
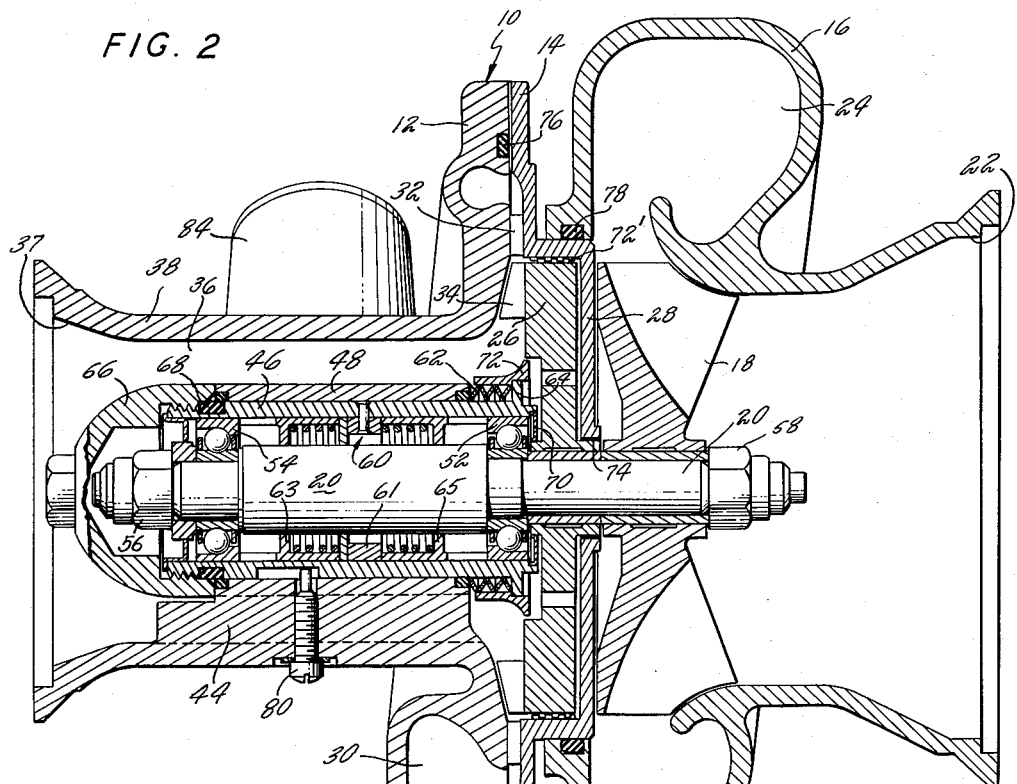
FIG. 2 is a section along the line 2—2 of FIG. 1.
Figure 1:
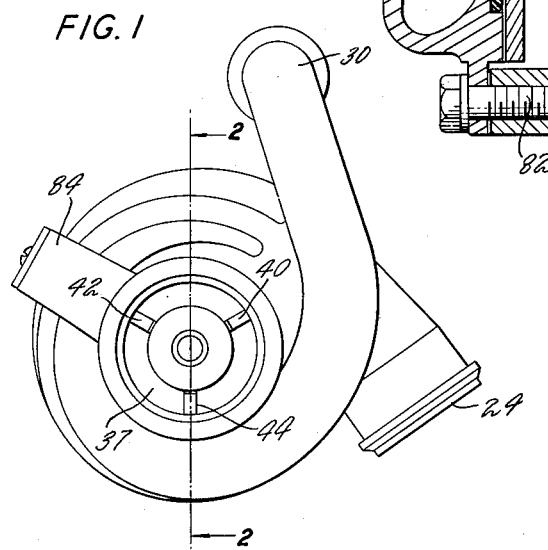
FIG. 1 is an end view looking into the turbine discharge end of the refrigerating unit.

In refrigerating mechanism used for conditioning the air in airplanes such as may be used in systems of the type shown and described in application Serial No. 471,152 of Sims and Farkas for Cabin Temperature Control System filed November 26, 1954, now Patent No. 2,917,288, difficulty has been experienced in adequately lubricating the bearings of the turbine-fan unit because of the high temperature of the air passing through the unit and because of the high speed, in the neighborhood of 60,000 r.p.m. These bearings have on occasion risen to such a high temperature that the oil used in lubricating the anti-friction bearings has been cooked or carbonized to such an extent that it lost its lubricating qualities.

As in the above-identified application No. 471,152 in which the system is more completely described and to which reference may be made for further details, air from a jet engine compressor is first led to a heat exchanger where some heat is extracted and is then led through a turbine where due to the energy extracted by the turbine the temperature of the air is further reduced. The turbine drives a fan which forces air through the heat exchanger and provides a means of loading the turbine. The system may be more readily understood if values of temperature and pressure are used in the explanation of the operation. It will be understood that these values are for explanation only and that the invention is not limited to these values or ranges.

If the compressor delivers air at 700° F. and at 60 p.s.i., it may be reduced to 200° F. and 55 p.s.i. in passing through the heat exchanger. The air may then be passed through the turbine where the temperature may be reduced from 200° F. to 0° F. and the pressure reduced to 10 p.s.i. It will thus be apparent that the exhaust from the turbine will be at a low temperature which may be in the neighborhood of 0° F.

The present invention relates to a refrigerating unit in which this comparatively cold air is utilized to prevent overheating of the turbine bearings.

Referring to the drawings, the refrigerating unit shown generally at 10 has a three-part housing comprising a turbine inlet and outlet housing 12, turbine nozzle support 14 and a fan inlet and outlet housing 16. A fan 18 is mounted on one end of a central shaft 20 for rotation therewith in housing 16 and upon rotation will function as a fluid circulating unit to pump air from the inlet 22 through the outlet 24 and thus absorb energy and provide work for the turbine 26 to do.

Turbine 26 is also mounted on the same end of shaft 20 adjacent fan 18, which is outboard of said turbine, so that a portion 28 of the nozzle housing 14 separates the fan 18 and the turbine rotor 26. Air from the jet engine is introduced into turbine inlet 30 and after passing through nozzle 32 and radially inward through turbine buckets 34 is led through an annular passage 36 longitudinally with respect to shaft 20 to the outlet 37 from whence it is led through any desired control or mixing device to the portion of the airplane to be heated or cooled. Projecting radially inward from the cylindrical portion 38 of the outer casing provided by housing 12 are three webs supporting a cylindrical member 48 concentric with, but spaced from, housing 38 to provide the annular passage 36 between housing 38 and cylinder 48. Passage 36 serves as a conduit or passageway for the air exhausted from the turbine 26. A bearing sleeve 46 is supported on the inner surface of cylinder 48, with which it forms an inner casing, and in turn supports anti-friction bearings 52, 54. The rear portion of shaft 20 extends between the bearings 52 and 54 so that those bearings rotatably support, and provide a cantilever mounting for, said shaft. The fan 18 and turbine 26 are mounted in back-to-back relation on the outwardly extending front portion of shaft 20 for rotation therewith. The inner-races of bearings 52 and 54 are clamped on to the shaft 20 by nuts 56 and 58 and the outer-races are positioned by bearing preloading mechanism indicated generally at 60, comprising a ring 61 riveted to bearing sleeve 46 and sleeves 63 and 65 spring pressed against the outer-races 52, 54. Sleeves 63, 65 are slotted adjacent the bearings to permit oil from the lubricator 84 to reach the bearings. Bearing sleeve 46 and the mechanism supported therein is spring-urged in one direction by high-rate bellville springs 62, acting between cylinder 48 integral with housing 38 and a flange 64 on sleeve 46. A nut 66 threaded on the end of sleeve 46 opposite flange 64 butts against cylinder 48 to provide an adjustable cap which closes its end of the bearing sleeve and is used to compress spring 62 to position sleeve 46 and turbine 26 with the desired amount of clearance in housing 12. A packing 68 together with nut 66 completely seals the end of bearing sleeve 46 adjacent to turbine outlet 37. A seal 70 having a small, say 1 or 2 thousandths, or no clearance from the hub of rotor 26, seals the opposite or turbine end of bearing sleeve 46. The bearings 52, 54 are thus substantially sealed as the only opening is the small opening adjacent to turbine rotor 26. As that is the only opening, there is no air flow through the bearings and there is little or no tendency for air, moisture, or dirt to pass into or through the bearings 52, 54. Ring 72 is secured to flange 64 and acts as a guide for the air passing from the turbine to the outlet 37. The cool air which may be, for example, 0° to 25° F. passing through annular passage 36 and over cylinder 48 will cool cylinder 48 which in turn will cool bearing sleeve 46 and sleeves 63 and 65 and hence cool the outer-races of bearings 52, 54 thus keeping the bearing temperature down to an operating temperature where they may be adequately lubricated.

The air being handled by the fan 18 may have a temperature of 150° F. to 450° F. and the air being fed to the turbine nozzle 32 may have a temperature of 250° F. so that, although there is insulation between the hot fan 18 and the bearing means, the turbine 26 and the fan 18 will tend to heat shaft 20 and this heat passing along shaft 20 will tend to heat bearings 52 and 54. There will, of course in addition, be some heat from friction in the bearings 52 and 54, operating at this high speed of approximately 60,000 r.p.m. Due, however, to the cold air passing over sleeve 48 any heating introduced through the shaft 20 and by friction of the bearings is dissipated through sleeves 46 and 48 and nut 66 at a rate sufficient to keep the bearings at a temperature within a lubricating range. It has been found that the temperature of the front bearings 52 can be maintained at approximately 110° F. and the rear bearing 54 at approximately 80° F. for a typical installation. With the bearings maintained at these temperatures, the trouble previously experienced with failure of lubrication has been completely eliminated. It has also been found that with the bearings substantially sealed, as above described, air does not flow through the bearings to wash away the lubricant and dust and foreign particles do not find their way into the bearings so that long trouble-free operation has been experienced.

Labyrinth seals are provided at 72' adjacent the turbine rotor periphery and at 74 at the rotor hub to reduce any leakage between the fan and the turbine and to improve the efficiency of the fan-turbine combination. Other seals are provided at 76 and 78 to make an air-tight housing. A stud 80 is threaded through web 44 and into a slot in bearing sleeve 46 to hold the sleeve against turning while the nut 66 is turned to position the turbine 26.

Sections 12, 14, and 16 of the housing may be connected by any suitable means such as bolt 82. Any suitable means may be used for supplying a limited quantity of oil to the bearings 52, 54 for lubricating the same. For instance, the lubrication may be supplied by a system such as in Patent No. 2,664,323 issued December 29, 1953, to W. M. Alford. The oil may be led through drilled holes in one of the webs 40, 42 leading from an oil reservoir 84 to a point adjacent to the bearings, suitable lubrication holes being provided in the cylinder 48 and bearing sleeve 46.

It is to be understood that the invention is not limited to the specific embodiment herein illustrated and described, but may be used in other ways without departure from its spirit as defined by the following claims.

I claim:

1. A turbine driven fan unit, comprising a housing, bearing structure including bearings in said housing and containing fluid flow passages, a shaft rotatably mounted on bearings in said bearing structure, a turbine wheel carried by said shaft adjacent one end of said shaft, a sealing member between said wheel and the adjacent end of said bearing structure and sealing means at the opposite end of said bearing structure, sealing said bearings from said flow passages, said housing having flow spaces for exhaust gases from said turbine connecting with said bearing structure passages to circulate turbine exhaust gases through said flow passages and cool said bearing structure, a fan carried by said shaft outboard of said turbine wheel and away from said bearing structure, and means to insulate said bearing structure from said fan.

2. A turbine driven unit comprising, a housing, rotating means including a shaft and a turbine mounted on one end of said shaft, an outlet passage in said housing connected with said turbine for conveying exhaust gases from said turbine, a casing for said rotating means closed at one end and supported in said passage, a seal through which said shaft extends at the other end of said casing and having a running clearance with said rotating means, bearing structure for supporting said turbine located in, and in heat transfer relation with, said casing, a fan driven by said turbine and mounted on the same end of said shaft as said turbine and outboard of said turbine, and means between said fan and said bearing structure insulating said bearing structure from said fan.

3. In air temperature regulating apparatus having bearings, a shaft mounted in said bearings, mechanism including a turbine and a fan supported on one end of said shaft, means cooling said bearings comprising a casing surrounding said bearings, an exhaust for said turbine leading the exhaust gases of said turbine in heat transfer relation to said casing and means supporting said bearings in said casing in heat transfer relation to said casing, said fan being driven by said turbine and mounted on the same end of said shaft as said turbine, adjacent thereto and outboard thereof.

4. A turbine driven fan unit comprising, a turbine, an inlet for said turbine, an outlet for said turbine, a housing supporting said inlet and said outlet, bearing structure in said housing including means encasing said structure and with said housing forming fluid flow passages connected with said outlet, bearings in said bearing structure and mounted in said encasing means in heat transfer relation to said encasing means, a turbine shaft mounted in said bearings and supporting said turbine on one of its ends, said turbine discharging radially inward toward said shaft and encasing means and into said fluid flow passages for cooling said bearing structure, a fan, driven by said turbine and mounted on the same end of said shaft as said turbine, adjacent thereto and outboard thereof.

5. In a turbine driven fluid circulating unit: an outer casing including inlet and exhaust ducts for said turbine; an inner casing; strut means supporting said inner casing from said outer casing in the exhaust duct of said turbine; bearing means carried by said inner casing; a central shaft having a front portion and a rear portion, said shaft being supported by and having said rear portion mounted for rotation in said bearing means; a turbine wheel surrounding a portion of said inner casing and secured to the front portion of said central shaft; a fluid circulating unit secured to the said front portion of said central shaft to be driven by said turbine wheel, and positioned outboard of said turbine wheel away from said rear portion of said shaft; and means to cool and insulate said inner casing and said bearing means.

6. In a turbine driven fluid circulating unit in which the turbine exhausts at a reduced temperature and the fluid circulating unit discharges at an elevated temperature: an outer casing including inlet and exhaust ducts for said turbine; an inner casing; strut means supporting said inner casing from said outer casing in the exhaust duct of said turbine; bearing means carried by said inner casing; a central shaft supported by said bearing means; a turbine wheel surrounding a portion of said inner casing and secured to said central shaft adjacent one end thereof; said fluid circulating unit being subject to heating and secured to said central shaft adjacent said turbine wheel, outward of said turbine wheel in a direction away from the remainder of said shaft; and means, including the turbine exhaust, to cool said inner casing and said bearing means; and means between said fluid circulating unit and said inner casing and said bearing means to insulate said inner casing and bearing means from said hot fluid circulating unit.

7. In a turbine driven fluid circulating unit: an outer casing including inlet and exhaust ducts for said turbine; an inner casing closed at one end and open at the other end; strut means supporting said inner casing from said outer casing in the exhaust duct of said turbine; bearing means carried by said inner casing in heat transfer relation to said casing; a central shaft supported in said inner casing by said bearing means and having a front portion extending through said open end of said inner casing and a rear portion terminating within, and adjacent the closed end of, said inner casing; a turbine wheel secured to said front portion of said central shaft; a fluid circulating unit also secured to said front portion of said central shaft outward of said turbine wheel in a direction away from the remaining portion of said shaft; and sealing means sealing the open end of said inner casing; said exhaust passage being adapted to conduct relatively cool exhaust gases over said inner casing to extract heat from said bearings, and said circulating unit being positioned and mounted to provide insulating means between said circulating unit and said bearing means.

8. In a turbine driven fluid circulating unit: an outer casing; an inner casing; strut means supporting said inner casing from said outer casing; bearing means carried by said inner casing; a central shaft supported by, and having a rear portion extending between, said bearing means and having a front portion extending outward from said rear portion; a turbine wheel having a portion adjacent one end of said inner casing and secured to said front portion; a fluid circulating unit secured to said front portion and drivably connected with said turbine wheel outwardly of said turbine wheel in a direction away from said rear portion; and lubricating means for said bearing means.

9. In a turbine driven fluid circulating unit: an outer casing; an inner casing; spring loaded bearing means contained within said inner casing; a central rotating shaft carried by, and having a rear portion extending between, said bearing means; a turbine wheel secured to a front portion of said central shaft extending outwardly from said rear portion; a fluid circulating unit secured to said front portion for driving by said turbine wheel, said fluid circulating unit being positioned outward of said turbine wheel away from said rear portion; means to conduct relatively hot fluid under pressure to said turbine wheel; means to exhaust the expended and cooled fluid from said turbine wheel; strut means supporting said inner casing in said turbine exhaust means whereby said inner casing and said bearing means are maintained at a relatively low temperature; means to conduct circulating fluid to and from said circulating unit; and lubricating means for said bearing means.

10. A turbine driven fluid circulating unit as described in claim 9 wherein the inner casing is fully closed at one end and is apertured at the other end to accommodate said central shaft, said inner casing carrying a sealing member within its aperture to cooperate with a member carried by said shaft whereby the interior of said inner casing constitutes a fully enclosed oil retaining space.

11. A turbine driven fluid circulating unit as described in claim 10 wherein the inner casing is fully closed at one end by a removable cap and the sealing member cooperates with a sealing member carried by said shaft whereby oil may be introduced into the enclosed space without disturbing the rotating assemblies comprising said shaft, bearing means, turbine wheel and fluid circulating unit.

12. A turbine driven fluid circulating unit as described in claim 11 wherein the inner casing includes a longitudinally movable sleeve, spring pressed in one direction, positioned by said removable cap and carrying said bearing means.

13. An air-circulating apparatus comprising: a turbine and a fan driven by said turbine; an outer casing; an inner casing supported by and spaced from said outer casing to form an exhaust duct for said turbine between said casings; bearing means carried by said inner casing; means positioning said bearing means in said inner casing; a shaft carried and positioned by said bearing means; an adjustable cap fully closing one end of said inner casing; sealing means, through which a front portion of said shaft extends, closing the other end of said inner casing; said fan and said turbine, drivingly connected to said fan, being mounted on said shaft front portion with the fan outboard of said turbine in a direction away from said bearings; means operably connecting said cap and said bearing positioning means to adjust the position of said fan and turbine by adjustment of said cap; and means insulating said fan from said bearings.

14. A unit as claimed in claim 13 in which the bearing positioning means includes resilient means loading said bearings.

15. A unit as claimed in claim 13 in which the bearing positioning means is spring pressed in one direction to a position determined by said adjustable cap.

16. Apparatus adapted to supply chilled air to an aircraft compartment, comprising a rotary shaft, anti-friction bearing means for said shaft, a sealed inner casing enclosing said bearing means, an outer casing surrounding said inner casing to provide a turbine exhaust passageway, and a radial flow turbine-centrifugal fan assembly mounted on one end of said shaft in back-to-back relation for rotation therewith with the fan outboard of the turbine so that cooled air supplied by said turbine flows over said bearing casing to cool the same, said fan having a discharge passageway leading away from said shaft so that hot air is blown away from the shaft by said fan.

17. Apparatus adapted to supply chilled air to an aircraft compartment, comprising a rotary shaft, a cantilever mounting for said shaft including antifriction bearing means and a sealed inner casing enclosing said bearing means, an outer casing surrounding said inner casing to provide a turbine exhaust passageway, and a radial flow turbine-centrifugal fan assembly mounted on the unsupported end of said shaft in back-to-back relation for rotation therewith with the fan outboard of the turbine so that cooled air supplied by said turbine flows over said bearing casing to cool the same, said fan having a discharge passageway leading away from said shaft so that hot air is blown away from the shaft by said fan.

References Cited in the file of this patent

UNITED STATES PATENTS

| | | |
|---|---|---|
| 1,076,142 | Mellin | Oct. 21, 1913 |
| 1,181,780 | Loewenstein | May 2, 1916 |
| 1,624,529 | Buffington et al. | Apr. 12, 1927 |
| 1,864,027 | Pedersen | June 21, 1932 |
| 2,072,656 | Trumpler et al. | Mar. 2, 1937 |
| 2,159,422 | Buchi | May 23, 1939 |
| 2,322,824 | Buchi | June 29, 1943 |
| 2,323,725 | O'Brien | July 6, 1943 |
| 2,359,177 | Warner | Sept. 26, 1944 |
| 2,447,292 | Van Acker | Aug. 17, 1948 |
| 2,664,323 | Alford | Dec. 29, 1953 |

FOREIGN PATENTS

| | | |
|---|---|---|
| 440,655 | Italy | Oct. 16, 1948 |